UNITED STATES PATENT OFFICE.

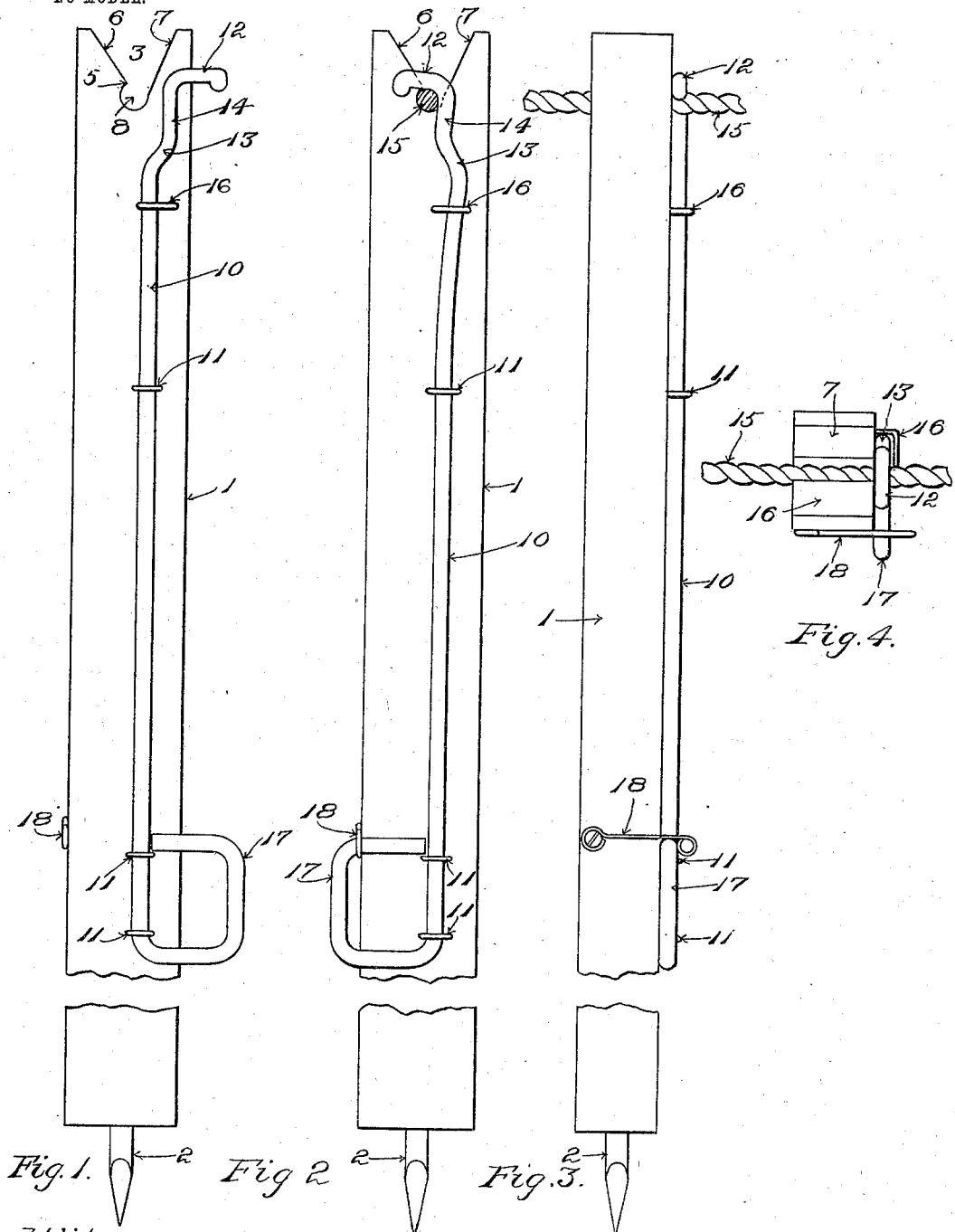

EDWARD J. PREST, OF UXBRIDGE, MASSACHUSETTS.

CLOTHES-LINE PROP.

SPECIFICATION forming part of Letters Patent No. 726,457, dated April 28, 1903.

Application filed January 2, 1903. Serial No. 137,402. (No model.)

*To all whom it may concern:*

Be it known that I, EDWARD J. PREST, a citizen of the United States, and a resident of Uxbridge, in the county of Worcester and State of Massachusetts, have invented certain new and useful Improvements in Clothes-Line Props, of which the following is a specification.

The object of this invention is to produce a pole or prop to support a clothes-line and to secure the line against pulling away from the pole.

The invention will now be fully described by reference to the accompanying drawings, and the novel features thereof will be particularly pointed out in the claims at the close of the specification.

In the drawings, Figure 1 is a plan of a pole or prop embodying the invention, showing the locking-wire in an open position. Fig. 2 is a plan showing the locking-wire turned into locking position. Fig. 3 is a view taken from the left-hand side of Fig. 2. Fig. 4 is a top end view.

Referring now to the drawings, 1 represents the pole, which may be of wood and of such length as desired and preferably having a spike 2 in the bottom end or having some other suitable means for securing the lower end in the ground. In the upper end of the pole there is formed a notch or recess 3 to receive the clothes-line. The notch preferably is broad at the upper end and tapering downward, the lower part 8 of the notch in which the line rests being broadened out somewhat as a groove, forming a lip 5 on one side above the bottom, which when the line is clamped to one side by the locking-wire will prevent the line from pulling out. The lower part of the notch is preferably a groove and in cross-section is in form of a segment of a circle, the lip 5 being formed by the tapering side 6 intersecting the circle above the center. The side 7 may intersect the circle at or below the center, so as to afford a wide enough neck through which the line may pass down into the bottom of the notch. This precise form of the notch, however, is not essential. Secured to the face of the pole longitudinally thereof at a short distance to one side of a line through the middle of the notch 8 is a spring wire or rod 10, secured in such manner as to allow partial rotation. This is preferably done by means of staples 11. The rod extends above the lower end of the notch and is formed with a lateral arm 12 and is also formed with an offset or bend 13, so that when the rod is turned through a half-rotation on its axis the upper portion 14 will be turned from the position shown in Fig. 1, in which it is out of engaging relation to the clothes-line 15 through an arc whose radius is equal to the offset, into the position shown in Fig. 2, in doing which the said portion 14 will engage the clothes-line and clamp it up against the side of the notch 8.

The staples 11 should allow freedom of rotation of the rod, but be close enough to prevent lateral play of the rod except above the uppermost one of said staples. The uppermost staple 11 should be sufficiently far below the offset 13 to permit the upper part of the rod to have a slight spring movement laterally, so as to yield sufficiently to be turned into the position shown in Fig. 2 when the clothes-line is in the notch and clamp the line securely in the notch.

Preferably a staple 16, broader than the staples 11, is employed near the offset to prevent the rod from springing away from the pole, but permitting lateral movement, as the rod yields when clamping the line.

The transverse arm 12 is sufficient to prevent the line from being pulled out of the notch without the employment of the lip 5; but the lip is preferable, as it brings the strain of the line in part against the lip 5, which extends the full thickness of the pole, instead of having it come entirely on the rod.

The lower end of the rod has a handle 17, preferably formed by bending a loop in the wire to turn the rod in its axis.

A catch 18 is provided to engage the handle and hold the rod in its locking position.

What I claim is—

1. In combination with a clothes-line pole having a notched upper end which receives the clothes-line, a spring locking-rod rotatably mounted on the side of the pole longitudinally thereof and extending above the bottom of the notch in the pole, bearings for said locking-rod, an offset in said rod which causes the upper portion of said rod to be out of engagement with the line when the rod is turned on its axis in one direction and which causes it to engage the line when turned in the other direction, and a transverse arm at the upper end of said rod which closes the passage of the line from the notch, substantially as described.

2. In combination with a clothes-line pole having a notched upper end which receives the clothes-line, a spring locking-rod mounted on the side of the pole longitudinally thereof and extending above the bottom of the notch in the pole, bearings for said rod, the upper part of said rod having freedom for a limited lateral movement, an offset in said rod below the upper end so that the portion above the offset rotates in the arc of a circle when the rod is turned on its axis, and when turned over on one side is out of the path of the line and when turned in the other direction engages the line and clamps it to the side of the notch in the pole, and a transverse arm at the upper end of said rod which engages the line on the upper side, substantially as described.

3. In combination with a clothes-line pole having in its upper end a recess which receives the line, a spring-rod mounted in bearings longitudinally of the pole whose axis is not in the same plane as the clothes-line, an offset in the upper portion of said rod which when the rod is turned on its axis in one direction engages and clamps the line laterally, a transverse arm which engages the said line on the upper side, a handle on said rod for operating it, and a fastening for securing the rod in its clamping position, substantially as described.

4. In combination with a clothes-line pole having in its upper end a recess which receives the line, a spring-rod mounted in bearings longitudinally of the pole whose axis is not in the same plane as the clothes-line, an offset in the upper portion of said rod which when the rod is turned on its axis in one direction engages and clamps the line laterally and a transverse arm which engages the said line on the upper side, substantially as described.

In testimony whereof I have affixed my signature in presence of two witnesses.

EDWARD J. PREST.

Witnesses:
WILLIAM M. PREST,
WILLIAM A. COPELAND.